United States Patent
Nakane

(10) Patent No.: US 6,640,743 B2
(45) Date of Patent: Nov. 4, 2003

(54) METER HAVING ILLUMINATED POINTER

(75) Inventor: Hideyuki Nakane, Nishio (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/900,888

(22) Filed: Jul. 10, 2001

(65) Prior Publication Data

US 2002/0002941 A1 Jan. 10, 2002

(30) Foreign Application Priority Data

Jul. 10, 2000 (JP) ........................................ 2000-208833

(51) Int. Cl.[7] .............................................. G01D 11/28
(52) U.S. Cl. ...................... 116/286; 116/62.1; 116/288; 116/DIG. 36
(58) Field of Search ................................ 116/62.1, 286, 116/287, 288, 284, DIG. 36

(56) References Cited

U.S. PATENT DOCUMENTS

| | | | | |
|---|---|---|---|---|
| 3,727,041 A | * | 4/1973 | Scott | 116/286 |
| 4,252,078 A | * | 2/1981 | Fukasawa et al. | 116/288 |
| 4,258,643 A | * | 3/1981 | Ishikawa et al. | 116/286 |
| 5,142,453 A | * | 8/1992 | Ohta et al. | 116/DIG. 36 |
| 5,531,181 A | * | 7/1996 | Cookingham | 116/288 |
| 5,603,283 A | * | 2/1997 | Owen | 116/284 |
| 5,706,757 A | * | 1/1998 | Hashimoto et al. | 116/288 |
| 5,845,598 A | * | 12/1998 | Ross et al. | 116/288 |
| 6,014,075 A | * | 1/2000 | Fujimori et al. | 116/288 |
| 6,182,601 B1 | * | 2/2001 | Baatz | 116/288 |
| 6,356,046 B1 | * | 3/2002 | Koumura et al. | 116/62.1 |

FOREIGN PATENT DOCUMENTS

| | | | | |
|---|---|---|---|---|
| GB | 2185576 A | * | 7/1987 | 116/288 |
| JP | 405256963 A | * | 10/1993 | 116/288 |
| JP | 405346331 A | * | 12/1993 | 116/286 |
| JP | 406066601 A | * | 3/1994 | 116/288 |
| JP | 406082274 A | * | 3/1994 | 116/288 |
| JP | 406221878 A | * | 8/1994 | 116/288 |
| JP | 9-21655 | | 1/1997 | |

* cited by examiner

*Primary Examiner*—Christopher W. Fulton
*Assistant Examiner*—Travis Reis
(74) *Attorney, Agent, or Firm*—Harness, Dickey & Pierce, PLC

(57) ABSTRACT

A pointer of a meter is driven by a driving unit disposed behind a scale plate. A wiring board for supplying electric current to a stepping motor included in the driving unit is placed between the scale plate and the driving unit. Plural light sources for illuminating the pointer are placed on the wiring board around a pointer shaft in the vicinity thereof. Terminal pins for supplying electric current to the stepping motor are positioned on the wiring board apart form the light sources to avoid wiring congestion around the pointer shaft. Since the light sources are freely placed around the pointer shaft, the light from the light sources can be uniformly distributed around the pointer shaft with high luminance.

6 Claims, 4 Drawing Sheets

METER HAVING ILLUMINATED POINTER

CROSS-REFERENCE TO RELATED APPLICATION

This application is based upon and claims benefit of priority of Japanese Patent Application No. 2000-208833 filed on Jul. 10, 2000, the content of which is incorporated herein by reference.

BACKGROUND OF THE INVENTION

1. Field of the Invention

The present invention relates to a meter driven by a driving unit having a stepping motor, the meter including an illuminated pointer.

2. Description of Related Art

A meter for use in an automotive instrument panel having an illuminated pointer is disclosed in JP-A-9-21655. The meter includes a scale plate, a light-guiding plate disposed behind the scale plate in parallel therewith, a wiring board disposed behind the light-guiding plate in parallel therewith, and a driving unit attached to the rear surface of the wiring board. A pointer rotating in front of the upper surface of the scale plate is connected to the driving unit via a pointer shaft extending through holes provided in the scale plate, the light-guiding plate and the wiring board. Plural light emitting diodes (LED) disposed on the upper surface of the wiring board in the vicinity of the pointer shaft emit light toward the light-guiding plate and the pointer.

Usually, the driving unit includes a stepping motor having a magnet rotor and a stator yoke with coil units. Coil ends of the coil units are electrically connected to the wiring board around the pointer shaft. Since the LEDs are also positioned in the vicinity of the pointer shaft, the wiring board around the pointer shaft is congested with both electrical connections for the coil ends and the LEDs. If the coil ends are positioned at a vicinity of the pointer shaft with priority, the location of the LEDs is restricted and light cannot be uniformly emitted through a pointer shaft hole.

SUMMARY OF THE INVENTION

The present invention has been made in view of the above-mentioned problem, and an object of the present invention is to provide an improved meter in which the coil ends are electrically connected to the wiring board at positions apart from the pointer shaft, around which illuminating light sources are positioned, to avoid wiring congestion around the pointer shaft.

In a meter, such as a meter for use in an automotive instrument panel, a pointer is driven by a driving unit disposed behind a scale plate. A wiring board is placed between the scale plate and the driving unit. Plural light sources such as light emitting diodes for illuminating the pointer are positioned on the wiring board in the vicinity of a pointer shaft. The driving unit includes a stepping motor having coil units and a magnet rotor.

Terminal pins for supplying electric current to the coil units are disposed on the wiring board and soldered to a current supply circuit formed on the wiring board. The terminal pins are placed apart from the light sources positioned around the pointer shaft to avoid wiring congestion in the vicinity of the pointer shaft.

The driving unit includes a reduction gear train for reducing rotational speed of the stepping motor and for transferring its rotational force to the pointer shaft. Alternatively, the pointer shaft may be directly driven by the stepping motor. A light-guiding plate may be disposed behind the scale plate, so that the light emitted from the light sources illuminates not only the pointer but also the scale plate. In the case the scale plate is illuminated, the scale plate is made of a transparent material.

Since the terminal pins for supplying electric current to the stepping motor coil units are positioned on the wiring board apart from the light sources, the light sources can be properly positioned around the pointer shaft in the vicinity thereof. Therefore, the light from the light sources is uniformly distributed around the pointer shaft with high luminance.

Other objects and features of the present invention will become more readily apparent from a better understanding of the preferred embodiments described below with reference to the following drawings.

DETAILED DESCRIPTION OF THE PREFERRED EMBODIMENTS (First Embodiment)

Figure 1:
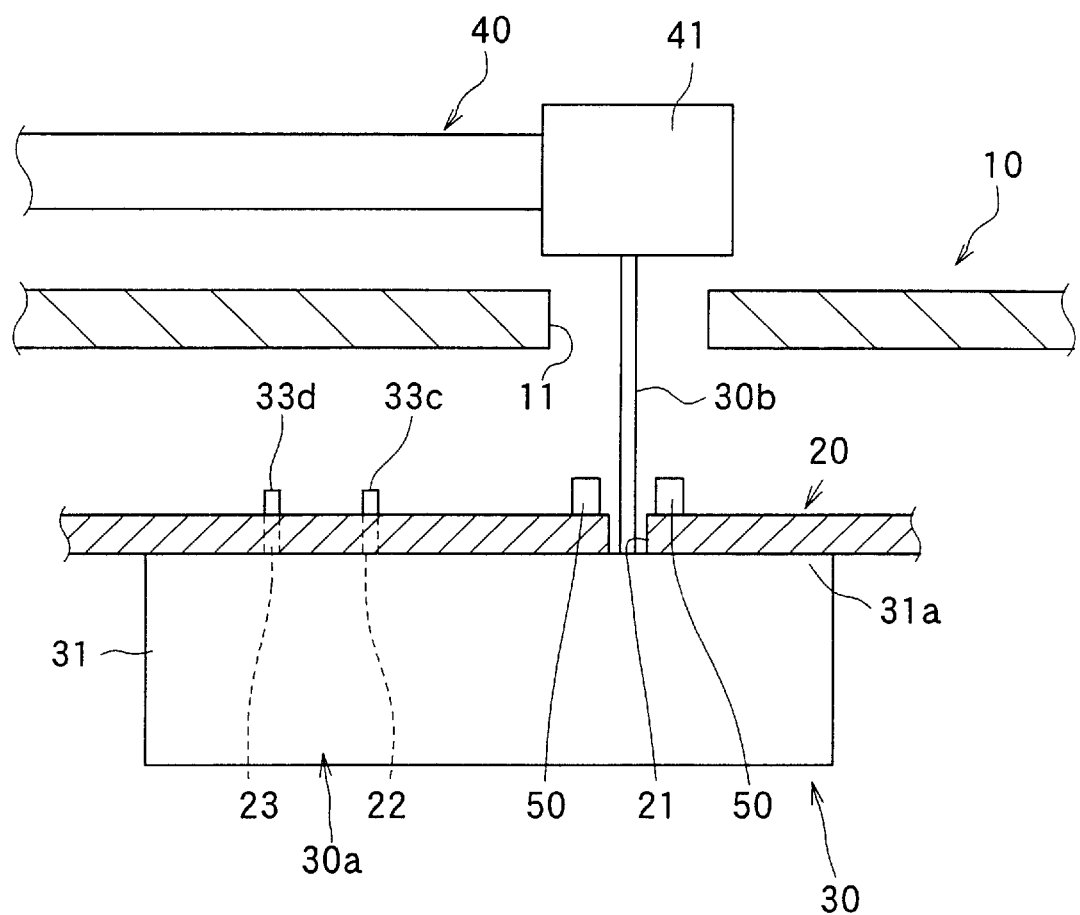
FIG. 1 is a cross-sectional view showing a portion of a meter as a first embodiment of the present invention.
Figure 2:
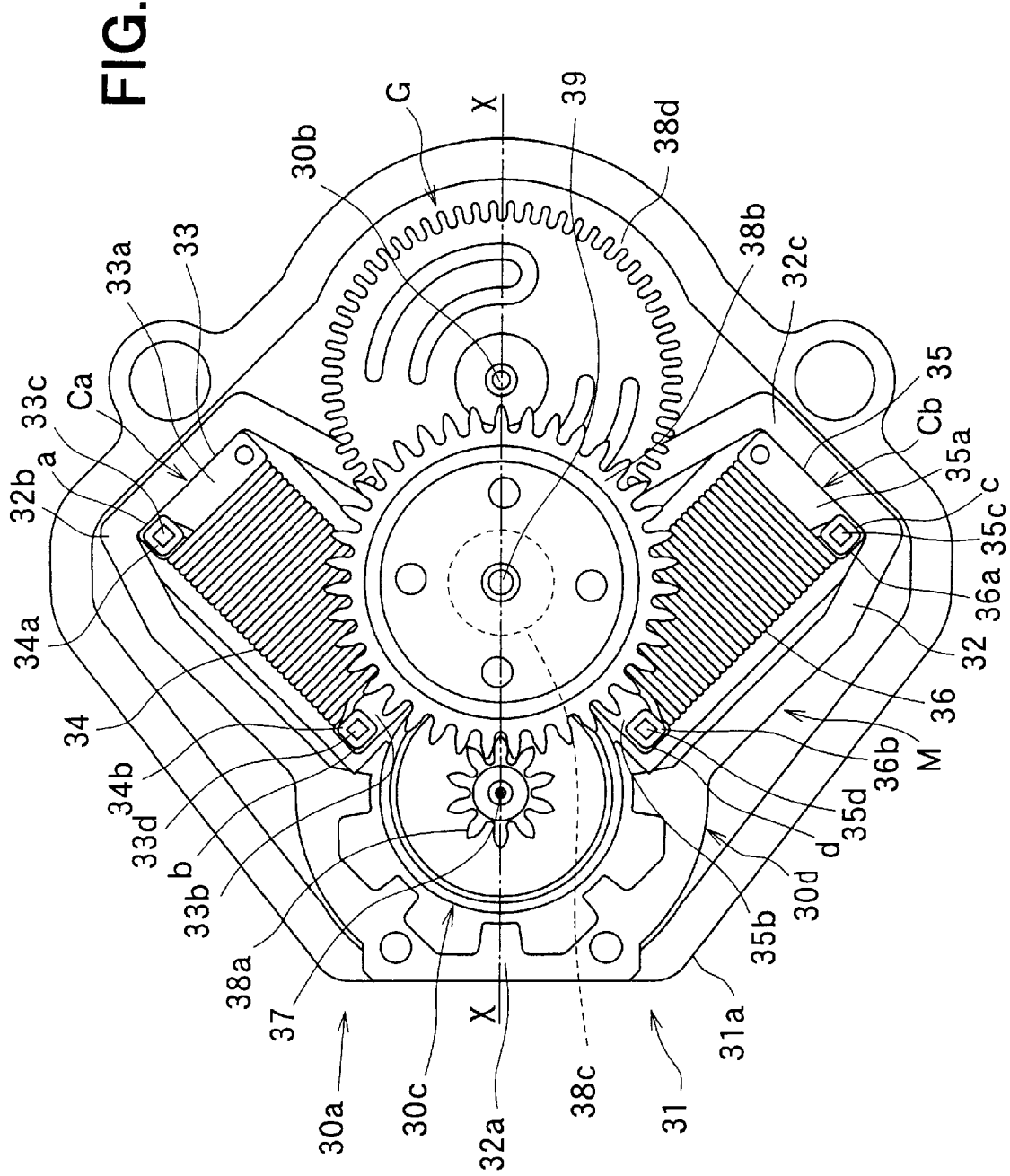
FIG. 2 is a plan view showing a driving unit of the meter shown in FIG. 1.

A first embodiment of the present invention will be described with reference to FIGS. 1 and 2. As shown in FIG. 1, the meter includes a scale plate 10, a wiring board 20 disposed behind the scale plate 10 in parallel therewith, and a driving unit 30 fixed to the rear surface of the wiring board 20. The driving unit 30 includes a driving mechanism 30a, which is shown in FIG. 2 in detail, and a pointer shaft 30b connected to a pointer base 41 of a pointer 40. The pointer shaft 30b extends upwards from the driving mechanism 30a through a through-hole 21 formed in the wiring board 20 and another through-hole 11 formed in the scale plate 10. The driving mechanism 30a is contained in a casing 31, and an opening 31a of the casing 31 is fixed to the rear surface of the wiring board 20.

As shown in FIG. 2, the driving mechanism 30a is composed of a stepping motor M and a reduction gear train G, both contained in the casing 31. The stepping motor M includes a stator 30d and a magnet rotor 30c. The stator 30d is composed of a circular yoke 32 fixed to the bottom wall of the casing 31 and a pair of coil units Ca, Cb disposed in the yoke 32. Substantially U-shaped yoke portions 32a, 32b and 32c are unitarily connected to form the circular yoke 32. Both coil units Ca, Cb, substantially rectangular-solid-shaped, are fixedly disposed in the yoke portions 32b, 32c, respectively.

The coil unit Ca is composed of a bobbin 33 and a solenoid coil 34 wound around the bobbin 33. The bobbin 33 made of insulating resin has a cylindrical portion having a rectangular cross-section and a pair of flanges 33a, 33b formed at both ends of the cylindrical portion. A terminal pin 33c fixed to the flange 33a at a position "a" (shown in FIG. 2) extends upwards through a through-hole 22 formed in the wiring board 20, as shown in FIG. 1. A terminal pin 33d fixed to the flange 33b at a position "b" extends upwards through a through-hole 23 formed in the wiring board 20, as shown in FIG. 1. One coil end 34a is wound around the terminal pin 33c, while the other coil end 34b is wound around the terminal pin 33d. Both terminal pins 33c, 33d are soldered on the upper surface of the wiring board 20 together with the coil ends 34a, 34b wound around the respective terminal pins 33c, 33d. Thus, both coil ends 34a, 34b are electrically connected to a circuit formed on the upper surface of the wiring board 20. The electrical connection may be made by other methods than soldering, such as welding.

Similarly, the coil unit Cb is composed of a bobbin 35 and a solenoid coil 36 wound around the bobbin 35. The bobbin 35 made of insulating resin has a cylindrical portion having a rectangular cross-section and a pair of flanges 35a, 35b formed at both ends of the cylindrical portion. A terminal pin 35c fixed to the flange 35a at a position "c" (shown in FIG. 2) extends upwards through a through-hole (not shown) formed in the wiring board 20. A terminal pin 35d fixed to the flange 35b at a position "d" extends upwards through a through-hole (not shown) formed in the wiring board 20. One coil end 36a is wound around the terminal pin 35c, while the other coil end 36b is wound around the terminal pin 35d. Both terminal pins 35c, 35d are soldered on the upper surface of the wiring board 20 together with the coil ends 36a, 36b wound around the respective terminal pins 35c, 35d. Thus, both coil ends 36a, 36b are electrically connected to a circuit formed on the upper surface of the wiring board 20. The electrical connection may be made by other methods than soldering, such as welding.

Both coil units Ca, Cb are positioned symmetrically with respect to line X—X connecting a magnet rotor shaft 37 and a pointer shaft 30b, and both center axes of the coil units Ca, Cb perpendicularly cross each other at the magnet rotor shaft 37. The coil unit Ca faces an outer periphery of the magnet rotor 30c at its flange 33b, while the coil unit Cb faces the outer periphery of the magnet rotor 30c at its flange 35b. The magnet rotor 30c is supported by the magnet rotor shaft 37 together with an input gear 38a within the yoke portion 32a. The outer periphery of the magnet rotor 30c faces poles formed in the yoke portion 32a. Thus, the magnet rotor 30c, both coil units Ca, Cb, and the yoke 32 form a magnetic circuit. The magnet rotor 30c rotates when both coil units Ca, Cb are energized through a circuit formed on the wiring board 20. The magnet rotor shaft 37 is rotatably supported between the bottom wall of the casing 31 and the wiring board 20.

As shown in FIG. 2, the reduction gear train G is composed of the input gear 38a, two intermediate gears 38b, 38c, and an output gear 38d. The intermediate gears 38b, 38c positioned between the magnet rotor shaft 37 and the pointer shaft 30b are commonly supported by a shaft 39. The shaft 39 is rotatably supported between the bottom wall of the casing 31 and the wiring board 20. The intermediate gear 38b engages with the input gear 38a, and the intermediate gear 38c engages with the output gear 38d fixed to the pointer shaft 30b. Thus, rotational force of the magnet rotor 30c is transferred to the pointer shaft 30b through the reduction gear train G with its rotational speed reduced. The gears 38a–38d forming the reduction gear train G are made of a material such as resin to suppress noises generated in the reduction gear train G.

As shown in FIG. 1, the pointer base 41 is fixed to the pointer shaft 30b extending from the driving mechanism 30a, and a luminous pointer 40 is connected to the pointer base 41. The luminous pointer 40 rotates in front of the scale plate 10. Plural light sources 50 composed of LEDs are positioned on the wiring board 20 around the pointer shaft 30b in the vicinity thereof and electrically connected by soldering to a circuit formed on the wiring board 20. Light emitted from the light sources 50 is led to the pointer base 41 through the through-hole 11 formed in the scale plate 10. Thus, the pointer 40 is illuminated by the light emitted from the light sources 50. The light sources 50 are not limited to the LEDs, but other light sources such as candescent lamps may be used.

In the first embodiment, as described above, the terminal pins 33c, 33d of the coil unit Ca are positioned at the positions "a" and "b", respectively, which are remotest from the pointer shaft 30b. Similarly, the terminal pins 35c, 35d of the coil unit Cb are positioned at the positions "c" and "d", respectively, which are remotest from the pointer shaft 30b. Those terminal pins 33c, 33d, 35c, 35d are soldered on the wiring board 20 at positions remote from the pointer shaft 30b. Therefore, the light sources 50 can be positioned and soldered on the wiring board 20 in the vicinity of the pointer shaft 30b without interfering with the terminal pins of the coil units. Further, the light sources 50 can be uniformly positioned around the pointer shaft 30b. Thus, the light can be incident uniformly upon the pointer base 41 with high luminance, and the pointer 40 is properly illuminated.

(Second Embodiment)

Figure 3:
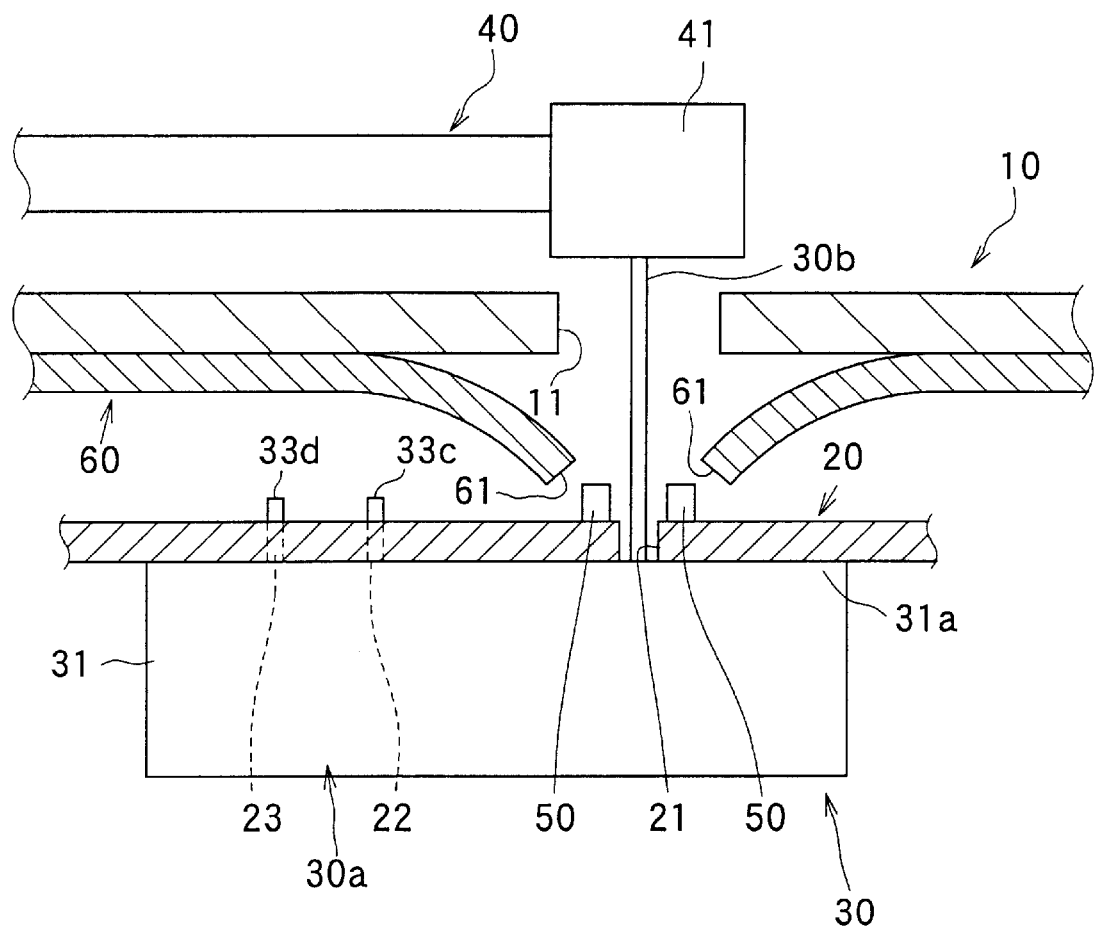
FIG. 3 is a cross-sectional view showing a portion of a meter as a second embodiment of the present invention.

A second embodiment of the present invention will be described with reference to FIG. 3. The second embodiment is similar to the first embodiment, except that a light-guiding plate 60 is additionally attached to the rear surface of the scale plate 10. The light-guiding plate 60 attached to the scale plate 10 is bent downwardly toward the wiring board 20 at its circular opening 61 formed around the pointer shaft 30b. The circular opening 61 is positioned to face the light sources 50, so that the light emitted from the light sources 50 is led not only to the pointer base 41 but also to the scale plate 10. The light led to the scale plate 10 illuminates the scale plate, and the light led to the pointer base 41 illuminates the pointer 40. The scale plate 10 of this embodiment is made transparent.

Since the terminal pins 33c, 33d, 35c, 35d of both coil units Ca, Cb are soldered on the wiring board 20 at positions remote from the pointer shaft 30b in this embodiment, too, the light sources 50 can be uniformly positioned around the pointer shaft 30b in the vicinity thereof. Accordingly, the same advantages as in the first embodiment are obtained in this embodiment, too. The luminous pointer 40 of the second embodiment may be replaced with a usual pointer, and the light emitted from the light sources may be solely used for illuminating the scale plate 10.

Figure 4:
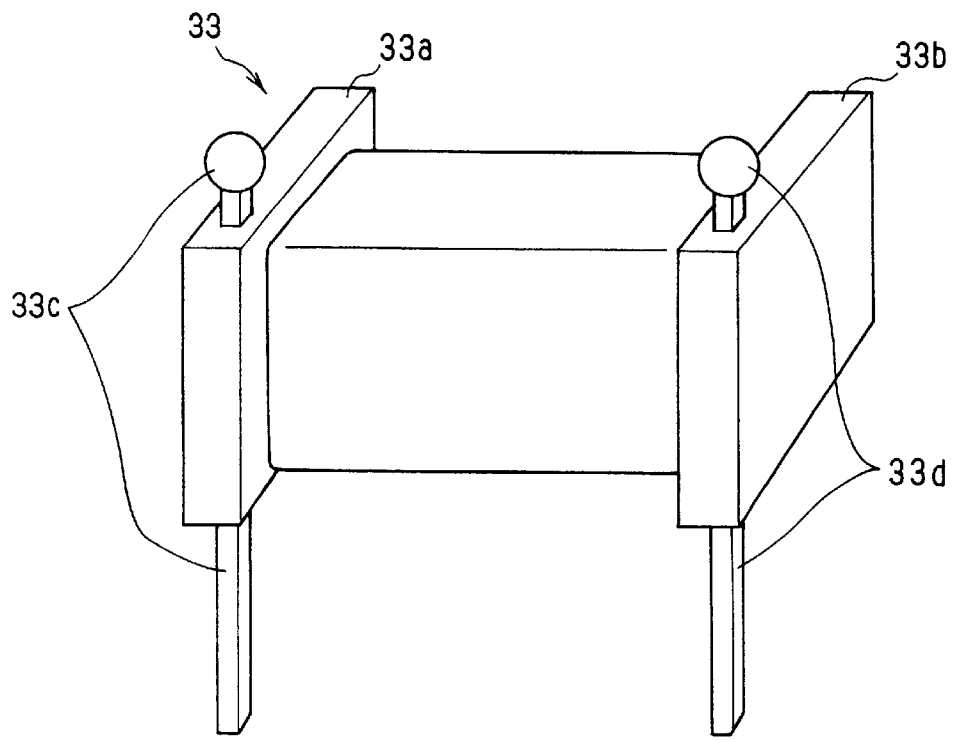
FIG. 4 is a perspective view showing in an enlarged scale a coil bobbin used in the driving unit shown in FIG. 2.
Figure 5:
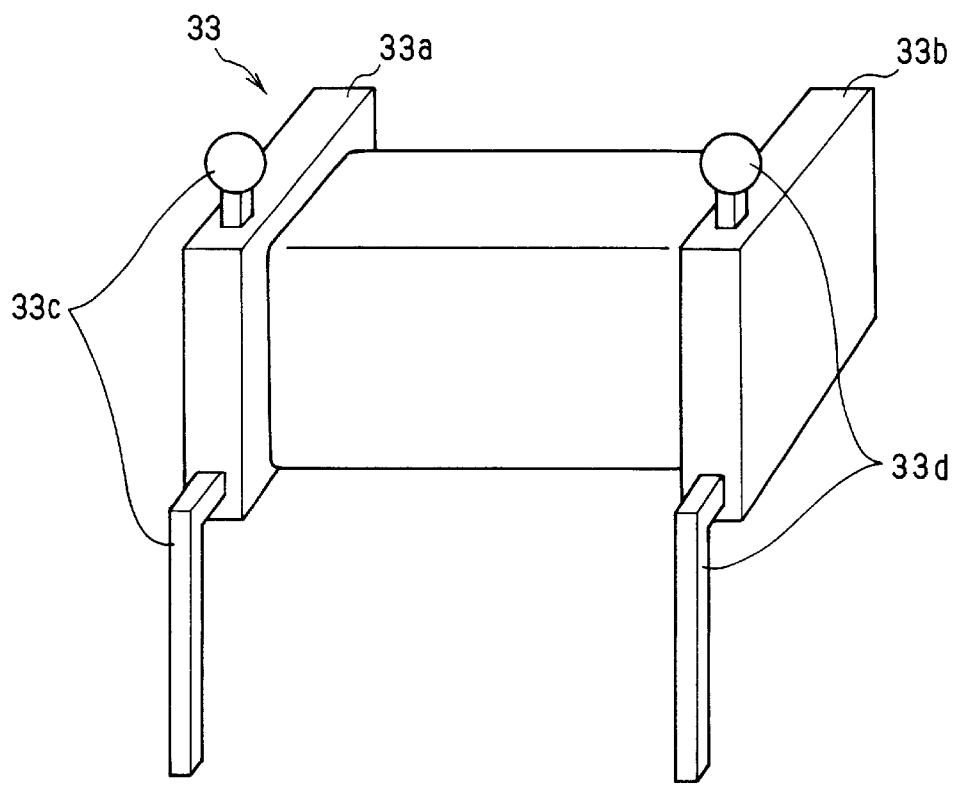
FIG. 5 is a perspective view showing in an enlarged scale a modified coil bobbin shown in FIG. 4.

The present invention is not limited to the foregoing embodiments, but it may be variously modified. For example, the terminal pins 33c, 33d used in the foregoing embodiments (the bobbin 33 having the terminal pins 33c, 33d is shown in FIG. 4 in an enlarged scale) may be modified to the shape shown in FIG. 5. The terminal pins 33c, 33d are bent, so that they can be positioned further away from the light sources 50 when the driving unit 30 is fixed to the wiring board 20. The pointer shaft 30b may be directly driven by the magnet rotor 30c without using the reduction gear train G. In this case, the terminal pin 33d of the coil unit Ca is moved to a position opposite to the position "a" where the terminal pin 33c is positioned. Similarly, the terminal pin 35d of the coil unit Cb is positioned opposite to the position "c" where the terminal pin 35c is positioned. In this manner, all the terminal pins 33c, 33d, 35c, 35d can be soldered on the wiring board 20 at positions remote from the pointer shaft 30b. The light sources 50 are freely placed in the vicinity of the pointer shaft without interfering the terminal pins.

Though an integrally formed yoke 32 is used in the foregoing embodiments, it may be divided into two portions, one for the coil unit Ca and the other for coil unit Cb. The meter according to the present invention may be properly used as a meter for various automotive vehicles, such as passenger cars, buses, trucks, motor cycles.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A meter comprising:
   a scale plate;
   a wiring board disposed behind the scale plate in parallel to the scale plate;
   a pointer disposed in front of the scale plate;
   a plurality of light sources, disposed on a front surface of the wiring board, for illuminating the pointer;
   a driving unit, fixed to a rear surface of the wiring board, for driving the pointer, the driving unit including a stepping motor composed of a pair of coil units having terminal pins for supplying electric power to the coil units and a magnet rotor adapted to be rotated by energizing the pair of coil units; and
   a pointer shaft connected between the pointer and the driving unit through the scale plate and the wiring board, wherein:
   the plurality of light sources are positioned around the pointer shaft in the vicinity thereof and electrically connected to the wiring board;
   the terminal pins are positioned remote from the pointer shaft and electrically connected to the wiring board;
   the pair of coil units are positioned symmetrically with respect to a line extending through the pointer shaft and a center of the magnet rotor so that longitudinal axes of the pair of coil units cross each other substantially at the center of the magnet rotor; and
   each of the pair of coil units includes a bobbin around which a coil is wound, the bobbin having a pair of flanges formed at both longitudinal ends thereof, each flange extending perpendicularly to the longitudinal direction of the bobbin and having one end more remote from the pointer shaft and the other end closer to the pointer shaft;
   the terminal pins are connected to each flange at the more remote end and electrically connected to the wiring board at a position corresponding to the more remote end; and
   the driving unit further includes a reduction gear train connected between the magnet rotor and the pointer shaft, so that the pointer shaft is driven by the magnet rotor through the reduction gear train with a reduced rotational speed.

2. The meter as in claim 1, wherein:
   the meter further comprises a light-guiding plate disposed behind the scale plate, the light-guiding plate having an opening facing the plurality of light sources for guiding light toward the scale plate and the pointer; and
   the scale plate is a transparent plate.

3. The meter as in claim 1, wherein:
   the terminal pins are soldered on a front surface of the wiring board.

4. The meter as in claim 1, wherein:
   the terminal pins are soldered on a rear surface of the wiring board.

5. A meter comprising:
   a scale plate;
   a wiring board disposed behind the scale plate in parallel with the scale plate;
   a pointer disposed in front of the scale plate, the pointer being attached to a pointer base;
   a plurality of light sources disposed on a front surface of the wiring board for illuminating the pointer;
   a driving unit fixed to a rear surface of the wiring board for driving the pointer, the driving unit including a stepping motor composed of a coil unit having terminal pins for supplying electric power to the coil unit and a magnet rotor adapted to be rotated by energizing the coil unit;
   a pointer shaft connected between the pointer base and the driving unit through the scale plate and the wiring board; wherein:
   each of the plurality of light sources are positioned adjacent the pointer shaft directly below the pointer base;
   the plurality of light sources are electrically connected to the wiring board at a first distance from or closer to the pointer shaft; and
   one of the terminal pins are positioned remote from the plurality of light sources and electrically connected to the wiring board at a second distance from the pointer shaft, the second distance being greater than the first distance; and
   the other terminal pins are positioned remote from the plurality of light sources and electrically connected to the wiring board at a third distance from the pointer shaft, the third distance being equal to or greater than the second distance.

6. A meter comprising:
   a scale plate;
   a wiring board disposed behind the scale plate in parallel to the scale plate;
   a pointer disposed in front of the scale plate;
   a plurality of light sources, disposed on a front surface of the wiring board, for illuminating the pointer;
   a driving unit, disposed behind and fixed to a rear surface of the wiring board, for driving the pointer, the driving unit including a stepping motor composed of a pair of coil units having terminal pins for supplying electric power to the coil units and a magnet rotor adapted to be rotated by energizing the pair of coil units; and
   a pointer shaft connected between the pointer and the driving unit through the scale plate and the wiring board, wherein:
   each of the plurality of light sources are positioned adjacent the pointer shaft and electrically connected to the wiring board at a first distance from or closer to the pointer shaft; and
   each of the terminal pins are positioned remote from the pointer shaft and the plurality of light sources and electrically connected to the wiring board at a position which is equal to or greater than a second distance from said pointer shaft, the second distance being greater than the first distance.

* * * * *